(12) United States Patent
Kim

(10) Patent No.: US 9,338,749 B2
(45) Date of Patent: May 10, 2016

(54) MOBILE TERMINAL AND BATTERY POWER SAVING MODE SWITCHING METHOD THEREOF

(75) Inventor: Jonghwan Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 853 days.

(21) Appl. No.: 13/444,749

(22) Filed: Apr. 11, 2012

(65) Prior Publication Data

US 2012/0315960 A1 Dec. 13, 2012

(30) Foreign Application Priority Data

Jun. 7, 2011 (KR) .......................... 10-2011-0054721

(51) Int. Cl.
*H04M 1/00* (2006.01)
*H04W 52/02* (2009.01)

(52) U.S. Cl.
CPC ............ *H04W 52/0254* (2013.01); *Y02B 60/50* (2013.01)

(58) Field of Classification Search
CPC ..................... H04L 67/322; H04L 2012/5678; H04L 2012/6489; H04L 67/34; H04L 12/4015; H04L 69/329; H04L 12/40143; H04L 47/2416; H04L 67/303; H04L 65/80; H04L 12/2898; H04L 51/08; H04W 48/16; H04W 88/18; H04W 8/183; H04W 8/22; H04W 4/02; H04W 4/021; H04W 4/027; H04W 4/028; H04W 52/0251; H04W 64/006; H04W 88/02; H04W 52/0254; H04W 52/028; H04W 52/0274; H04W 52/0277; H04W 52/285; H04W 52/288; H04W 68/00; G06Q 30/0267; G06F 1/3203; G06F 1/3209; G06F 1/3265; G09G 2330/021; G09G 2320/06; G09G 2320/0606; G09G 2320/0626; H04N 21/4436; H04B 17/0045
USPC ........... 455/574, 573, 572, 404.2, 405, 414.1, 455/419, 456.1; 370/328, 331, 330, 329
See application file for complete search history.

(56) References Cited

U.S. PATENT DOCUMENTS

| | | | |
|---|---|---|---|
| 8,260,374 B2 * | 9/2012 | Wang et al. .................... | 455/574 |
| 2005/0070339 A1 * | 3/2005 | Kim ............................... | 455/572 |
| 2005/0085277 A1 * | 4/2005 | Chen et al. ..................... | 455/572 |
| 2005/0191028 A1 * | 9/2005 | Matsuda et al. ................ | 386/46 |
| 2007/0037610 A1 * | 2/2007 | Logan ............................ | 455/574 |
| 2008/0057894 A1 * | 3/2008 | Aleksic et al. .............. | 455/187.1 |
| 2009/0077347 A1 * | 3/2009 | Edwards et al. ................ | 712/34 |
| 2010/0159893 A1 * | 6/2010 | Baldwin et al. ............... | 455/413 |
| 2011/0143730 A1 * | 6/2011 | Zaffino et al. .............. | 455/414.1 |

* cited by examiner

*Primary Examiner* — Nimesh Patel
(74) *Attorney, Agent, or Firm* — Lee, Hong, Degerman, Kang & Waimey PC; Jonathan Kang; Justin Lee

(57) ABSTRACT

A mobile terminal is switched into a specific battery power saving mode based upon a usage pattern of the terminal so as to control battery power saving items individually or by each group. A method for switching a battery power saving mode of the mobile terminal includes analyzing a usage pattern of the terminal, automatically switching the terminal mode into a power saving mode according to the analyzed usage pattern, and controlling a displayed screen with respect to each event in the switched power saving mode.

22 Claims, 17 Drawing Sheets

FIG. 3

| BATTERY RELATED ITEM | OFF | Preset -Light | Preset -Medium | Preset -Strong |
|---|---|---|---|---|
| Wi-Fi | USER SETTING (DEFAULT OFF) | ON | OFF | OFF |
| GPS | USER SETTING (DEFAULT ON) | ON | OFF | OFF |
| Bluetooth | USER SETTING (DEFAULT OFF) | ON | OFF | OFF |
| 3G Data | USER SETTING (DEFAULT OFF) | ON | OFF | OFF |
| TASK EXECUTED | USER SETTING (DEFAULT OFF) | ON | OFF | OFF |
| Screen Brightness | USER SETTING (DEFAULT DEPENDING ON MODEL) | 40% | 30% | 20% |
| Screen timeout | USER SETTING (DEFAULT 1 MIN) | 30 SEC | 15 SEC | 15 SEC |
| Auto - rotate screen | USER SETTING (DEFAULT ON) | OFF | OFF | OFF |
| Animation | USER SETTING (DEFAULT ON) | ON | OFF | OFF |
| Gesture | USER SETTING (DEFAULT OFF) | OFF | OFF | OFF |
| Silent | USER SETTING (DEFAULT OFF) | ON | ON | ON |
| Vibrate | USER SETTING (DEFAULT ONLY IN SILENT MODE) | Only in Silent mode | OFF | OFF |
| Battery & indication | TBD | - | - | - |

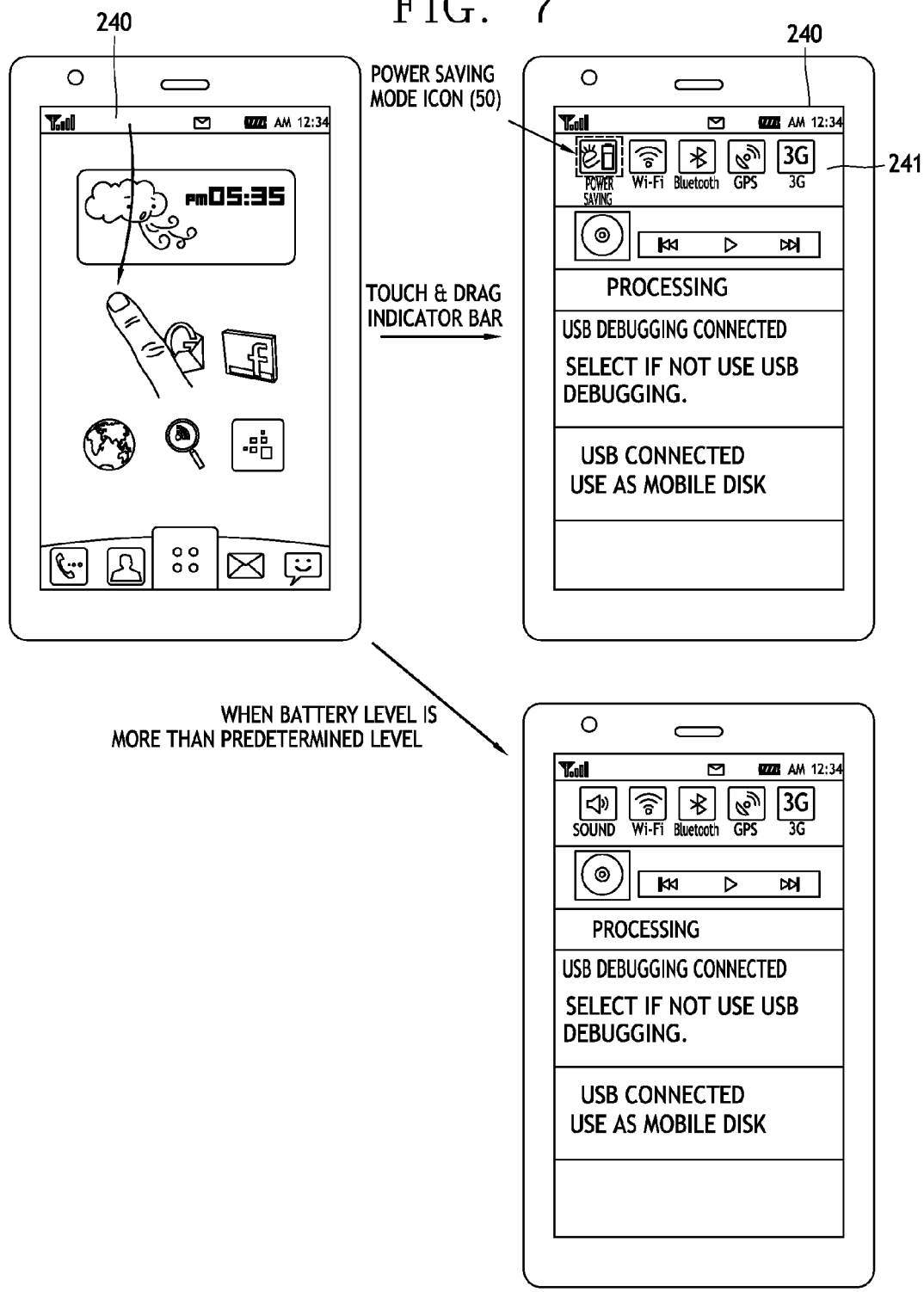

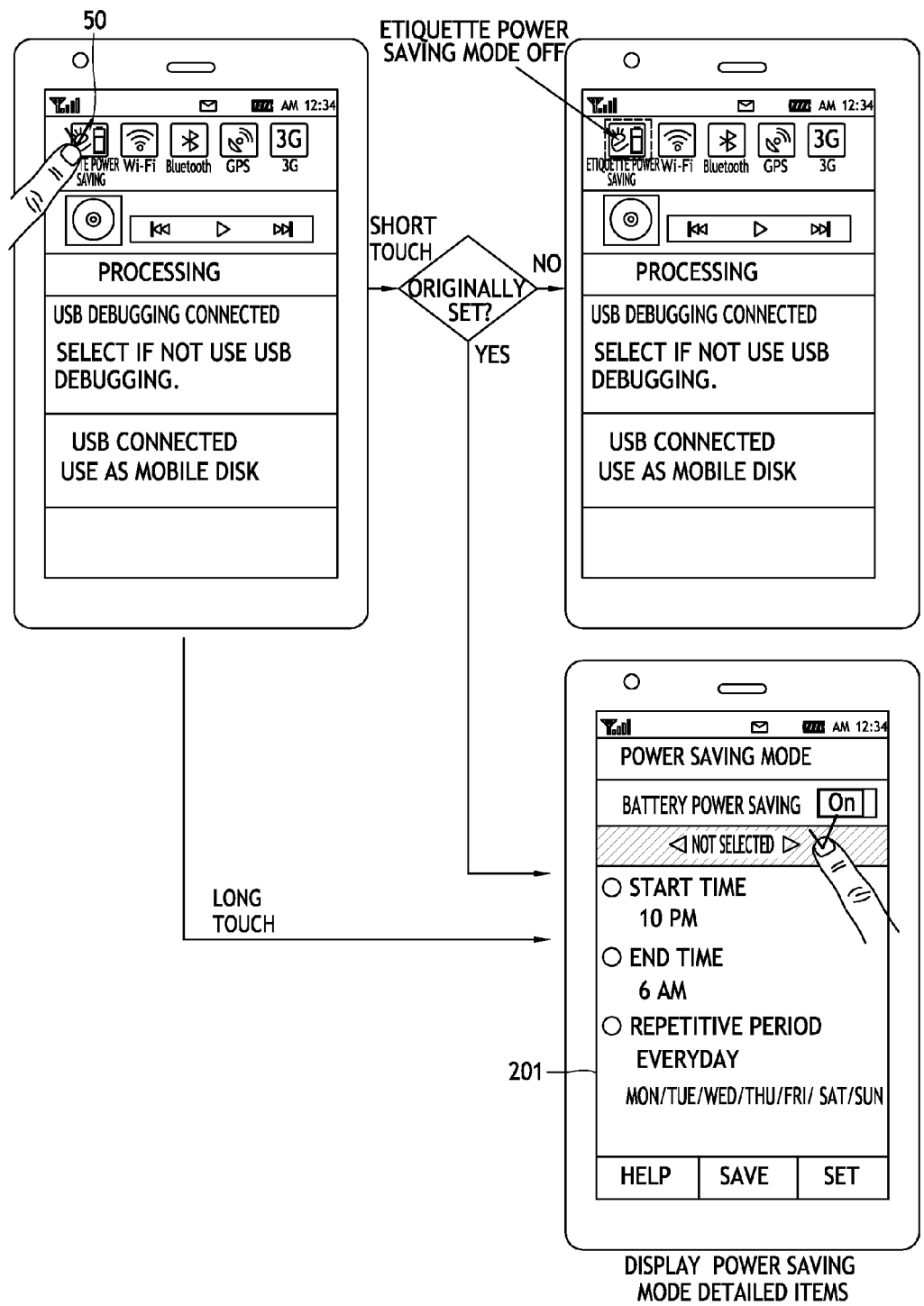

MOBILE TERMINAL AND BATTERY POWER SAVING MODE SWITCHING METHOD THEREOF

CROSS-REFERENCE TO RELATED APPLICATION

Pursuant to 35 U.S.C §119, this application claims the benefit of Korean Patent Application No. 10-2011-0054721, filed on Jun. 7, 2011, the contents of which is hereby incorporated by reference herein in its entirety.

BACKGROUND OF THE INVENTION

1. Field of the Invention

This specification relates to battery power saving, and particularly, to a mobile terminal capable of controlling battery power saving items individually or by each group by switching the terminal into a specific battery power saving mode based on a usage pattern of the terminal, and a battery power saving switching method thereof.

2. Background of the Invention

Mobile terminals may be configured to perform various functions, for example, data and voice communication, capturing images or video, storing voice, reproducing music files via a speaker system, displaying images or video and the like. Some of mobile terminals may include an additional function of playing games, and other mobile terminals may be implemented as multimedia players. In addition, in recent time, mobile terminals can receive broadcast or multicast signals to allow viewing of video or television programs.

Furthermore, many efforts are undergoing to support or enhance various functions of such mobile terminals. Such many efforts include not only changes and improvement of structural components implementing a mobile terminal but also software or hardware improvement.

Among others, a touch function of the mobile terminal is designed for a user unfamiliar to button/key input using a touch screen to conveniently execute operations of the mobile terminal. In recent time, the touch function is becoming an important function of the terminal together with a user interface (UI), in addition to a simple input function.

The mobile terminal receives power for operation from a battery mounted in a rear surface thereof. A remaining capacity of the battery (battery level, power level) is displayed on a predetermined portion of a screen in real time after charging, and a user recharges the battery using a charger at a particular place for a specific time based upon the displayed battery level.

Examples of elements associated with the battery of the mobile terminal, namely, elements receiving power from the battery and affecting power consumption of the battery include 3G data, Wi-Fi, GPS, various sensors (acceleration, vibration, proximity, luminance), display (LCD, LED), execution task and the like.

As such, in order to perform a desired operation using an element equipped in the mobile terminal while power is supplied by one battery mounted in the mobile terminal, it is necessary to effectively use the batter power (or remainder or remaining capacity of the battery). That is, it is required to overall control the battery power saving mode, such as controlling a large element causing high power consumption according to the remaining capacity of the battery, controlling a specific element to be selectively run when the remainder of the battery is below a predetermined level.

SUMMARY OF THE INVENTION

Therefore, an aspect of the detailed description is to provide a mobile terminal capable of switching a specific battery power saving mode based upon a usage pattern of the terminal, and a battery power saving mode switching method thereof.

Another aspect of the detailed description is to provide a mobile terminal capable of setting power saving items individually or by each group in a specific battery power saving mode, and a battery power saving mode switching method thereof.

To achieve these and other advantages and in accordance with the purpose of this specification, as embodied and broadly described herein, a method for switching a battery power saving mode in a mobile terminal including analyzing a usage pattern of the terminal, automatically switching the terminal mode into a power saving mode according to the analyzed usage pattern, and controlling a displayed screen with respect to each event for power saving in the switched power saving mode.

The usage pattern may include a battery usage, a time-based call record, time, place, schedule and mode setting, and battery power saving items are automatically set as default values based on the usage pattern.

The power saving mode may be released in response to a user touch/key input, an elapse of a set time, a detection of a terminal movement, a release of a lock screen, a generation of an alarm or morning call and an initiation of charging.

The method may further include notifying the switching into the power saving mode, displaying an icon indicating the power saving mode being switched, and displaying a setting screen for the power saving mode when the icon is touched.

Individual items or a group of items for the battery may be set on the setting screen for the power saving mode.

The individual items of the battery may include setting items related to base station wireless data, various sensors, display and execution task, and the group of items may include setting items that the individual items are classified into at least one group according to battery power consumption.

When an e-mail is received in the power saving mode, only text without an attachment may be received, and the attachment may be received after the power saving mode is released.

When the power saving mode is activated, screen brightness may be adjusted to a readable level, and a screen displayed may be selectively controlled according to a type of content to be displayed.

In accordance with another aspect of the detailed description, there is provided a method for switching a battery power saving mode in a mobile terminal including activating a power saving mode in response to a user input, displaying an icon indicating the activated power saving mode, selecting the icon to set time information for the power saving mode and battery power saving items, and entering the power saving mode according to the set time information to control event processing and screen displaying.

The power saving mode may be activated when an indicator bar receives a touch & drag, and the battery power saving items may be set individually or by each group.

The individual battery power saving items may include base station wireless data, various sensors, display and execution task, and the group of battery power saving items may include at least one individual battery power saving item classified into a group according to battery power consumption.

The power saving mode may be released in response to a user touch/key input, an elapse of a set time, a detection of a terminal movement, a release of a lock screen, a generation of an alarm or morning call and an initiation of charging.

When an e-mail is received in the power saving mode, only text without an attachment may be received, and the attachment may be received after the power saving mode is released.

When the power saving mode is activated, screen brightness may be adjusted to a readable level, and a screen displayed may be selectively controlled according to a type of content to be displayed. That is, when the content is a video, only sound may be output with the displayed screen off, or only sound may be output with a specific portion of the screen on and the other portions off. Here, when the content is a photo or still image, an original screen may be reconstructed into a simplified form and displayed.

In accordance with one aspect of the detailed description, there is provided a mobile terminal including a display configured to display an operating state of the terminal, a storage unit configured to store operating results of the terminal, and a controller configured to display an icon for a power saving mode on the display in response to a user input, and display a time for the power saving mode and battery power saving items upon selection of the icon, so as to control event processing and screen displaying according to the time information and the battery power saving items.

The icon for the power saving mode may be displayed when an indicator bar receives a touch & drag, and the battery power saving item may be set individually or by each group.

The individual battery power saving items may include base station wireless data, various sensors, display and execution task, and the group of battery power saving items may include at least one individual battery power saving item classified into a group according to battery power consumption.

The controller may display a screen for setting the battery power saving items when the touch input for selecting the icon is a long touch, and display a screen for setting power saving items or release the power saving mode according to whether the power saving mode has been activated when the touch input is a short touch.

The controller may release the power saving mode in response to a user touch/key input, an elapse of a set time, a detection of a terminal movement, a release of a lock screen, a generation of an alarm or morning call and an initiation of charging.

The controller may carry out an automatic answering function with respect to a preset user or group when a call or message is received in the power saving mode.

The controller may receive only text without an attachment when an e-mail is received in the power saving mode and then receive the attachment after release of the power saving mode.

The controller may adjust screen brightness to a readable level when the power saving mode is activated, and control a displayed screen according to a type of content to be displayed.

The controller may output only sound with the displayed screen off, or output only sound with a specific portion of the screen on and the other portions off, when the content is a video.

The controller may reconstruct an original screen into a simplified form when the content is a photo or still image.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 3 shows setting items for a power saving mode with respect to battery related items;

FIG. 7 shows an exemplary embodiment of setting the power saving mode using an indicator bar;

FIGS. 9A and 9B show a flowchart of displaying detailed items for the power saving mode by selecting a power saving mode icon, and screens displayed thereby;

DETAILED DESCRIPTION OF THE INVENTION

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it can be easily understood by those skilled in the art that the configuration according to the following description can be applied to the stationary terminals except for components particularly provided for mobility.

Figure 1:
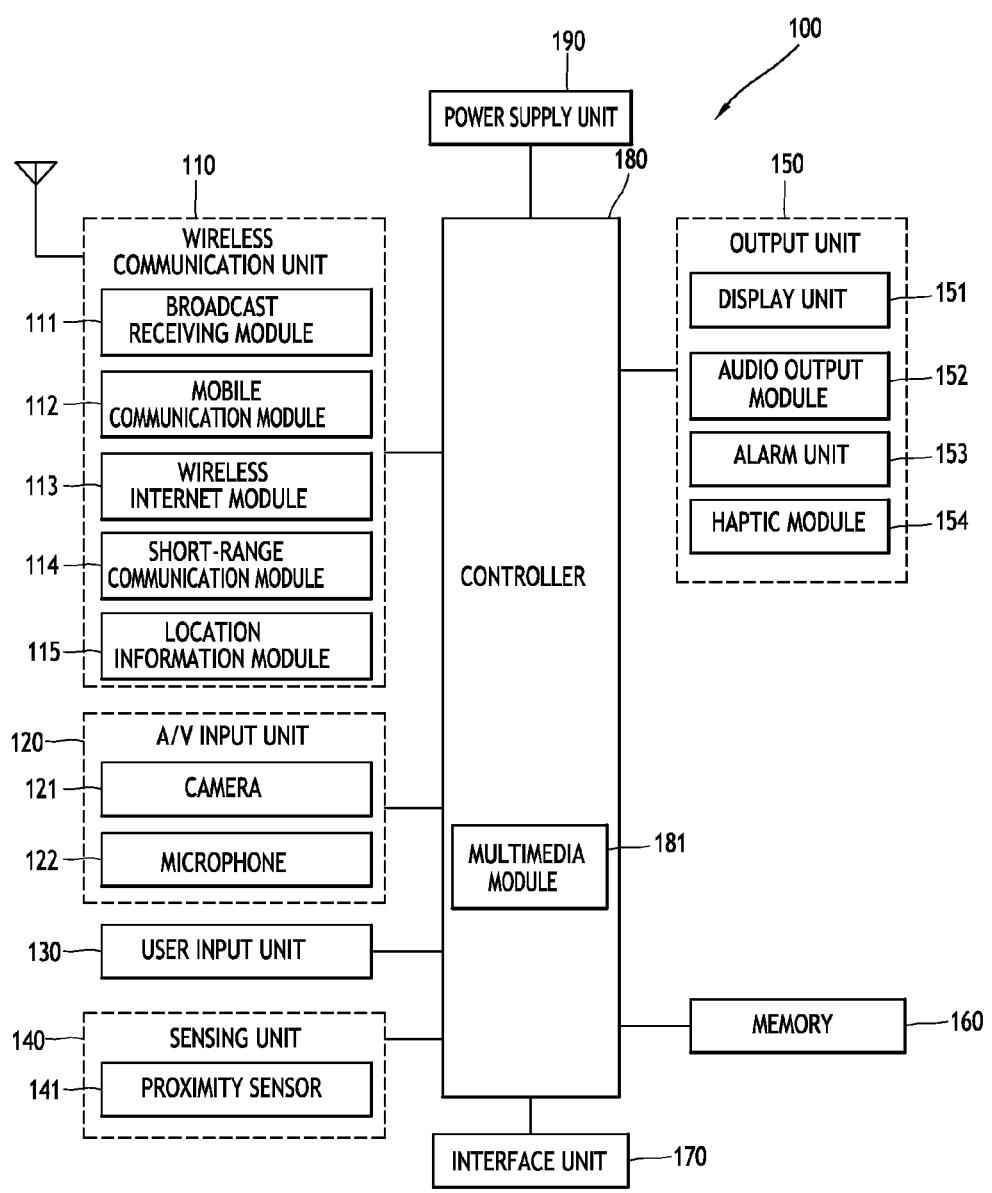
FIG. 1 is a block diagram of a mobile terminal in accordance with one exemplary embodiment.

FIG. 1 is a block diagram of a mobile terminal in accordance with one embodiment of the present invention.

The mobile terminal 100 may comprise components, such as a wireless communication unit 110, an Audio/Video (NV) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Position System (GPS) module. Under the current technique, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Also, the GPS module may continuously calculate a current position in real time so as to obtain speed information.

The A/V input unit 120 is configured to provide audio or video signal input to the mobile terminal. The NV input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like. Here, the sensing unit 140 may include a proximity sensor 141, which will be described later in relation to a touch screen.

The sensing unit 140 includes a geomagnetic sensor, a gyro sensor to calculating a rotating direction, and an acceleration sensor to calculate a movement distance by multiplying a user's pace by the number of step.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The output unit 150 is configured to output an audio signal, a video signal or an alarm signal. The output unit 150 may include a display 151, an audio output module 152, an alarm 153, a haptic module 154 and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and as an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. Some of the displays can be configured to be transparent such that it is possible to see the exterior therethrough. These displays may be called transparent displays. A representative example of the transparent display may include a Transparent Organic Light Emitting Diode (TOLED), and the like. The mobile terminal 100 may include two or more of such displays 151 according to its embodiment. For example, the mobile terminal 100 may simultaneously include an external display (not shown) and an internal display (not shown). The touch screen may be configured so as to detect a touch input pressure as well as touch input position and touch input area.

The audio output module 152 may output audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

The alarm 153 may output a signal to inform a generation of event associated with the mobile terminal 100. Typical events may include call signal received, message received, key signal input, touch input and the like. In addition to generating the audio or video signal, the alarm 153 may also inform the event generation in different manners. The video or audio signal may be outputted via the display 151 or the audio output module 152. Hence, those components 151, 153 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various haptic effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, a processing method for a user input with respect to a mobile terminal will be described.

The user input unit 130 may be manipulated to receive a command input for controlling the operation of the mobile terminal 100, and include a plurality of manipulation units. The plurality of manipulation units may be referred to as a manipulating portion. The manipulating portion may be operated by a user in any tactile manner.

Various types of visible information may be displayed on the display unit 151. Such information may be displayed in several forms, such as character, number, symbol, graphic, icon or the like.

For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another.

For example, an output window and an input window may be displayed at upper and lower portions of the display unit 151, respectively. The output window and the input window are allocated regions for outputting or inputting of information. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted or a text displayed on the output window may be input into an application.

The display 151 or the touch pad may be scrolled to receive a touch input. A user may scroll the display 151 or the touch pad to move a cursor or pointer positioned on an object (subject), e.g., an icon or the like, displayed on the display 151. In addition, in case of moving a finger on the display 151 or the touch pad, the path of the finger being moved may be visibly displayed on the display 151, which can be useful upon editing an image displayed on the display 151.

One function of the mobile terminal may be executed in correspondence with a case where the display 151 (touch screen) and the touch pad are touched together within a preset time. An example of being touched together may include clamping a terminal body with the user's thumb and index fingers. The one function, for example, may be activating or deactivating of the display 151 or the touch pad.

The mobile terminal 100 of FIG. 1 may be configured to operate within a communication system which transmits data via frames or packets, including both wireless and wireline communication systems, and satellite-based communication systems.

Figure 2:
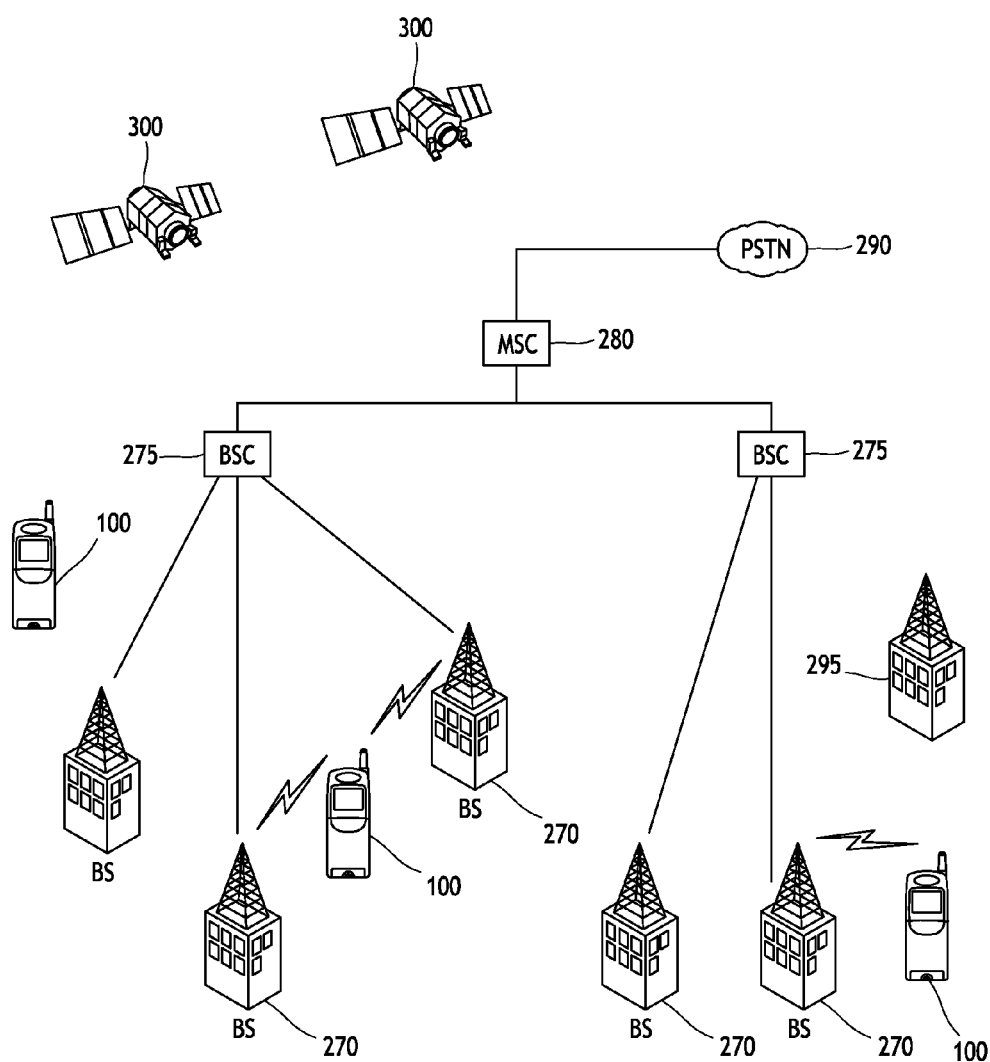
FIG. 2 is a block diagram of a wireless communication system operable with the mobile terminal in accordance with the one embodiment.

FIG. 2 shows a communication system operable with the terminal.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Referring now to FIG. 2, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2 further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

The present disclosure provides an approach for switching on or off (activating or deactivating (releasing)) a power saving mode (or an etiquette power saving mode) based on a user' life pattern, to effectively control items (or elements) related to power consumption of the battery, for example, 3G data, Wi-Fi, GPS, various sensors (acceleration, vibration, proximity, luminance), display (LCD, LED), execution task and the like. The life pattern is automatically analyzed when the remaining capacity of the battery (battery level) is below a predetermined level.

1. Power Saving Mode

A battery power saving mode (hereinafter, abbreviated to power saving mode) according to this specification indicates a mode for controlling items related to a battery individually or by each group. Especially, the power saving mode is a comprehensive battery control mode considering a usage pattern of a terminal, a time and a place in order to use the terminal the most efficiently not only when the remaining capacity of the battery is below a predetermined level but also before until being recharged after charging (or until completely discharged).

2. Power Saving Mode Entry

In accordance with the present disclosure, the entry into the power saving mode may be carried out by an automatic method and a manual method.

First, the automatic method indicates a method for entering (switching on or activating) the power saving mode based on a user's life pattern (a battery usage pattern). The life pattern may include a battery usage, a call/message transmission/reception distribution (call record analysis on a time basis), time setting, place, schedule and settings of various modes (sleep mode, vibration mode).

That is, the controller 180 checks the user's pattern of using a battery, so as to automatically activate a power saving mode when the power saving mode is in an Off state (deactivated state), and automatically deactivate the power saving mode when the power saving mode is in an On state (activated state).

As one example, when the battery level is lowered down to a predetermined level, the controller 180 automatically switches on the power saving mode, and automatically enters the power saving mode according to the battery usage pattern, namely, by referring to a call or message transmission/reception distribution (call record analysis on a time basis), a time for schedule (e.g., conference) or a set value (time) of a specific mode (e.g., sleep mode). Especially, when the battery level is lowered below the predetermined level, the controller 180 may notify the entry into the power saving mode to the user.

Also, in accordance with the present disclosure, when the battery level reaches a first level, the power saving mode may be activated according to the battery usage pattern. Also, when the battery level is further dropped from the first level down to a second level, the power saving mode may be automatically activated (switched on).

Once the power saving mode is switched on, an icon for the power saving mode, which will be explained later, may be displayed on a screen. Power saving items may be automatically set, for example, as defaults, according to the battery usage pattern, or a user may select (touch) the icon to additionally set detailed battery items (individual items or group of items (group items)) for the power saving mode.

The thusly-set power saving mode may be automatically released when the following conditions are met.

- detection of a user key/touch input
- detection of a phone movement or a specific position (e.g., home)
- generation of alarm/morning call
- release of a screen lock mode
- initiation of charging (including both wired and wireless charging)

Upon entry into the power saving mode, the controller 180 may activate or deactivate operations of the battery related items according to a state of the mobile terminal or a user setting.

The manual method is carried out in response to a user touch input, and whether or not to switch on or off elements (or items) related to the battery may be set individually or by each group. The individual item may include at least one of 3G data (base station wireless data), Wi-Fi, BT, GPS, various sensors (acceleration, vibration, proximity, and luminance), display (LCD, LED), execution task and the like. The group of items may be set by classifying individual items into predetermined groups in the order of power consumption of the battery.

FIG. 3 shows setting items for a power saving mode with respect to battery related items.

As shown in FIG. 3, when a power saving mode is initially switched on, power saving values for the battery related items may be set to 'preset-medium,' and thereafter maintained as values changed by user inputs. Here, when turning Wi-Fi off, the battery power is saved but the network traffic rather increases. Hence, upon a default being applied thereto, the Wi-Fi may be set to 'unchecked.'

The power saving mode may be set by selecting 'power saving mode' included in a phone setting menu or by selecting a power saving mode icon located at an indicator region of a screen.

Figure 4A:
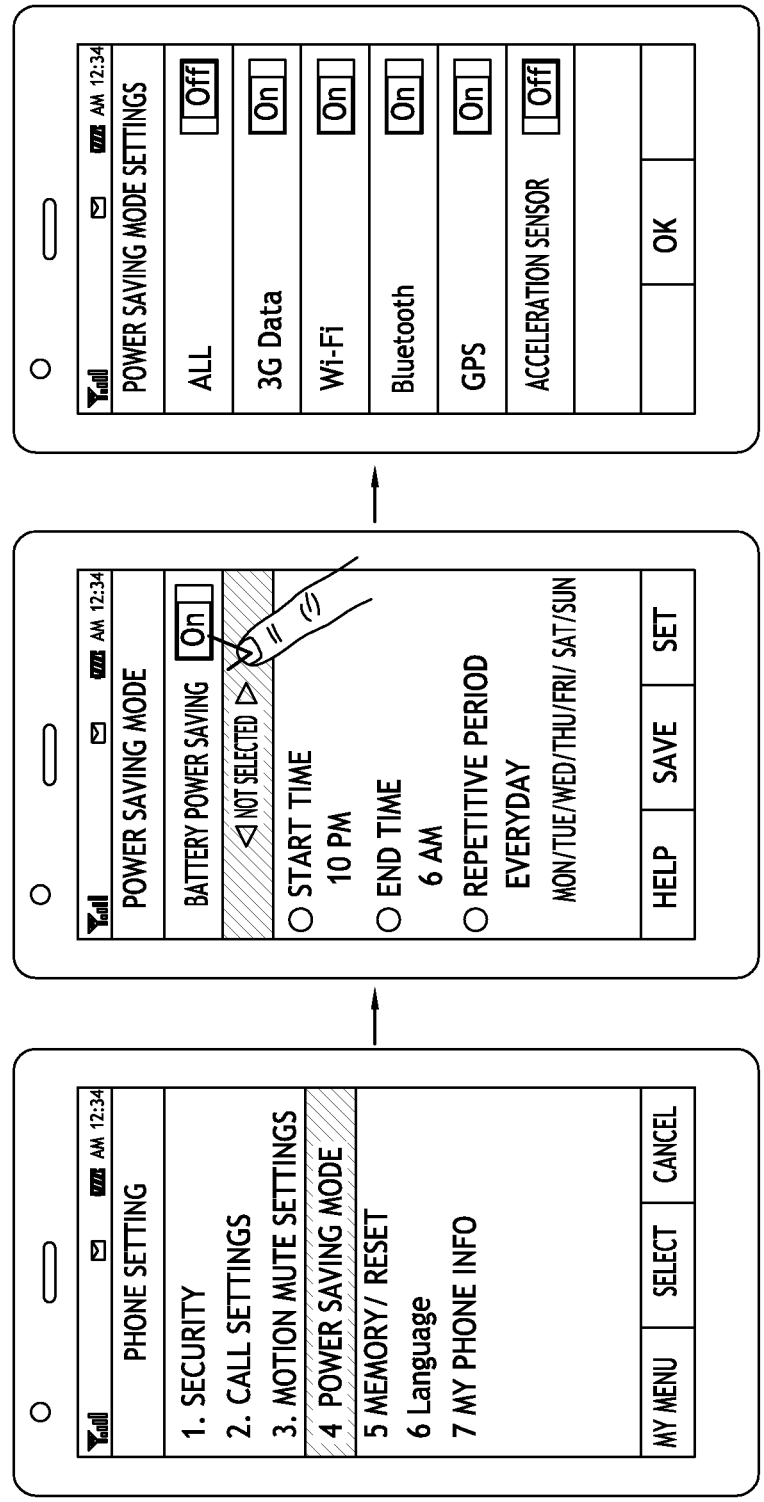
FIGS. 4A and 4B show an exemplary embodiment of setting a power saving mode and detailed power saving mode items thereof through a phone setting menu.
Figure 4B:
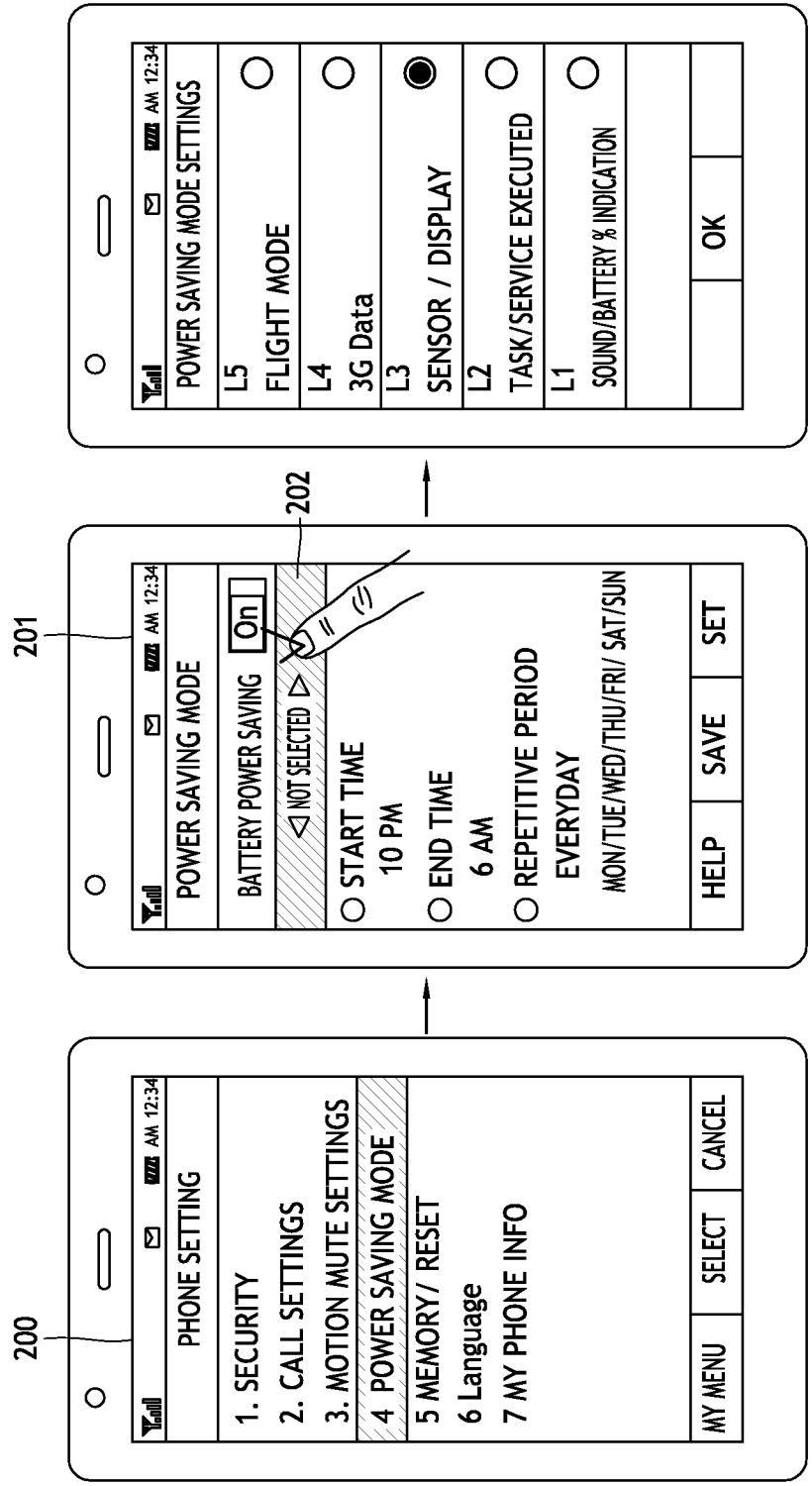

FIGS. 4A and 4B show an exemplary embodiment of setting a power saving mode and detailed power saving mode items thereof through a phone setting menu.

As shown in FIGS. 4A and 4B, a user sets 'power saving mode' through the phone setting menu 200. Once the power saving mode is activated, the activated state of the power saving (e.g., ON) is displayed on a screen 201 and the user is then able to set detailed items for the power saving on the corresponding screen 201. The battery power saving set to 'ON' is switched to 'OFF' in response to a touch input, or the power saving state is displayed in the order of On-Off-Auto so as to indicate that the power saving has been set to ON mode, OFF mode and Auto mode.

As one example, a portion 202 'not selected' is touched to set the power saving mode with respect to individual items for the battery (individual battery items) (FIG. 4A) or group items for the battery (group battery items) (FIG. 4B). Also, a user may further set a start time, an end time and a repetitive period of the power saving with respect to the detailed items for which the power saving has been set.

The individual items for the battery, as shown in FIG. 4A, may include a 3G data (base station wireless data), a wireless LAN (Wi-Fi), Bluetooth (BT), GPS, various sensors (acceleration, vibration, proximity, luminance), display (LCD, LED), execution task and the like.

The group items (group of items) for the battery may be made by classifying the individual items into at least one group according to the power consumption of the battery. Namely, FIG. 4B shows five groups (L1~L5), namely, sound/battery percentage (%) indication (L1), execution task/service (L2), sensor/display (L3), 3G data (L4) and flight mode (L5). The group of items may differ according to user settings without limited to the five groups. Here, once the group of items for the battery is set, the thusly applied detailed operations will be as follows.

(1) L5: Flight mode
blocking Circuit service (CS) (e.g., call, message)
(2) L4: Always on (e.g., push data: GPS, base station wireless data: 3G data)
switching 3G data icon on indicator bar from on to off
Long Term Evolution (LTE)→switched to WCDMA (because LTE does not support CS)
(3) L3: sensor, display
Sensor off: Wi-Fi, GPS, acceleration sensor, vibration sensor (haptic), proximity sensor and luminance sensor
Display (LCD, LED): '10% brightness,' 'turn off after 30 seconds'
(4) L2: background application/service item
Terminate all of applications being executed as background
Terminate all of services able to stop among services being executed as background
(5) L1: sound, battery percentage (%) indication
Battery % indication: periodic battery check release
Non-sound processing
Debugging mode release
Screen rotation lock
3D to 2D conversion
CS communication interval: increasing communication interval with a base station for call/message As such, a user may set whether or not to activate the battery power saving with respect to the individual battery items (FIG. 4A) or the group of battery items (group battery items). When the user enters an OK button after setting completed, the corresponding set value is stored in the memory 160.

Figure 5A:
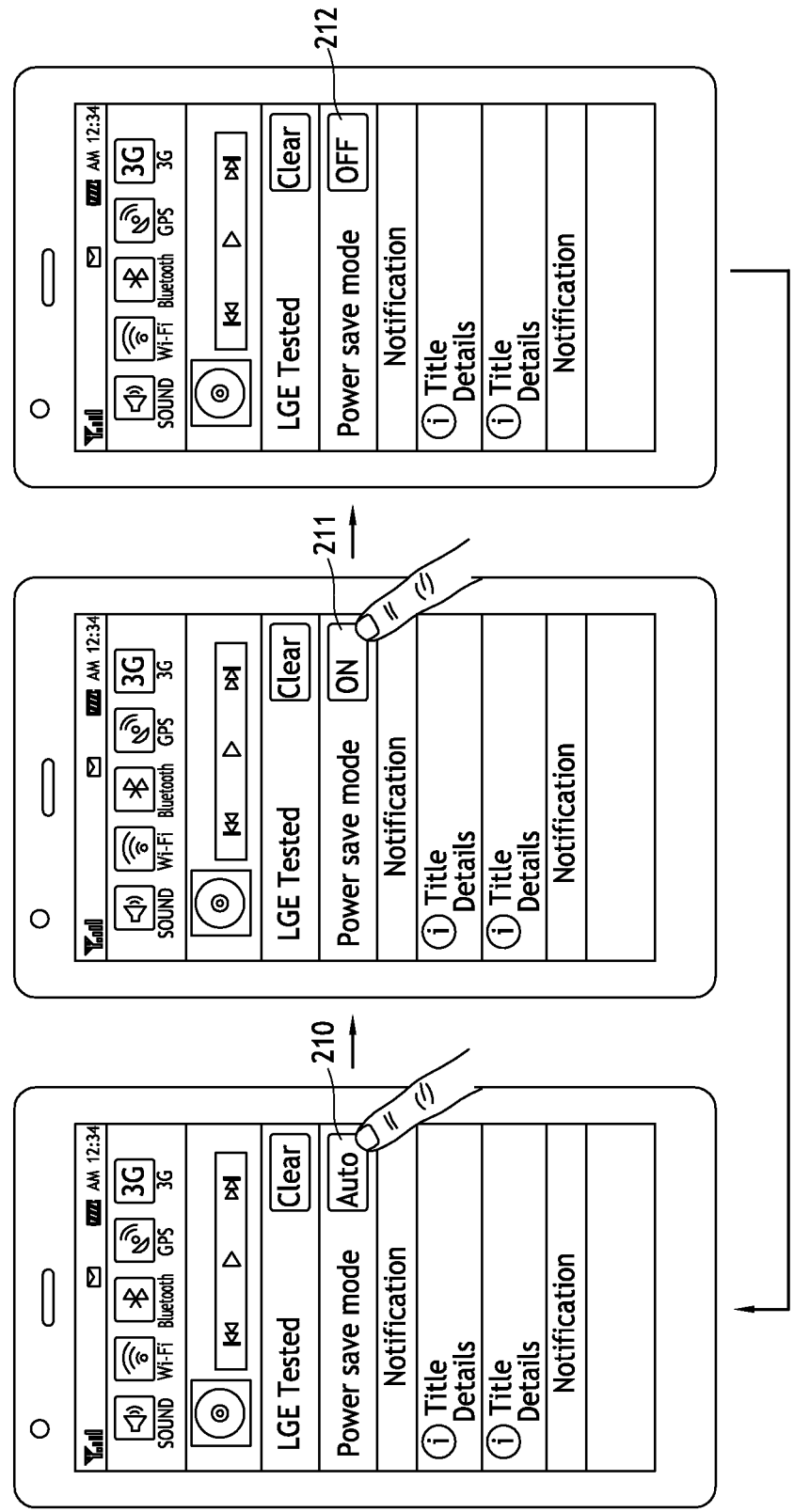
FIGS. 5A and 5B show a power saving mode switching and indication changes in response to the power saving mode switching.
Figure 5B:
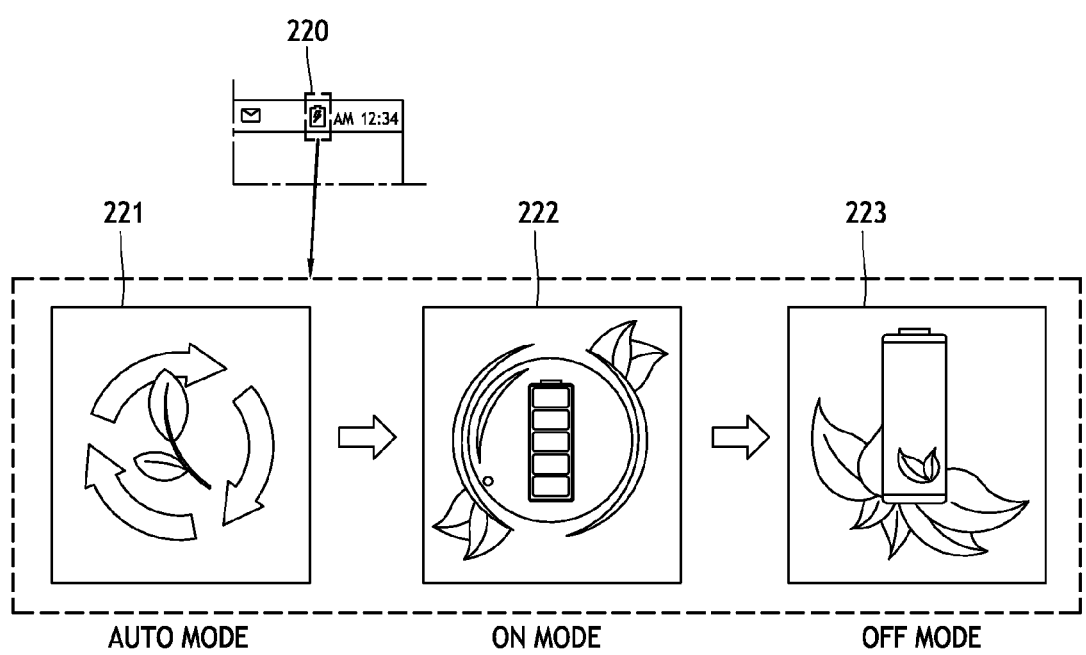

FIGS. 5A and 5B show a power saving mode switching and indication changes in response to the power saving mode switching.

As shown in FIG. 5A, a battery power saving mode may be set from On to Off state or vice versa (On→Off), and also the On, Off and Auto battery power saving modes may be switched in a recursive manner. For example, assuming that the power saving mode has originally been set, the controller 180 indicates the power saving mode as 'Auto' mode 210. Under this state, when the corresponding 'Auto' 210 is touched, the controller 180 then switches the 'Auto' mode into 'On' mode 211. When the 'On' mode 211 is touched, the controller 180 switches the 'On' mode into 'Off' mode 212. Thereafter, when the 'Off' mode 212 is touched, the power saving mode is set back to the 'Auto' mode 210. The mode switching may be equally applied to FIGS. 4A and 4B.

The controller 180 may display (indicate) the set state of the power saving mode on a predetermined region in response to a user input. That is, as shown in FIG. 5B, the controller 180 may change a battery icon 220 on an indicator region in response to the mode switching shown in FIG. 5A and display the changed icon (221, 222, 223).

Figure 6A:
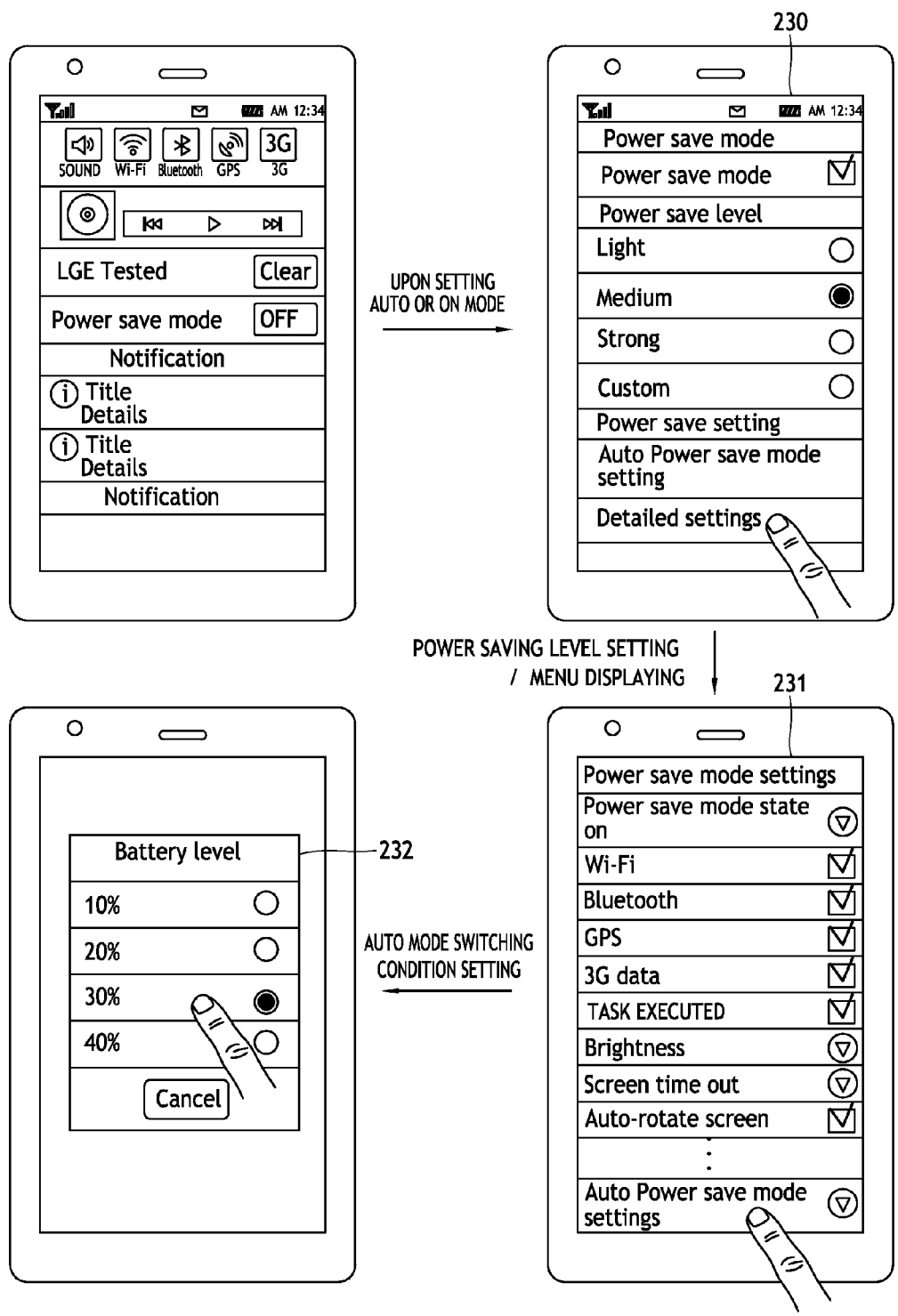
FIGS. 6A and 6B show another exemplary embodiment of setting detailed power saving mode items in the power saving mode.
Figure 6B:
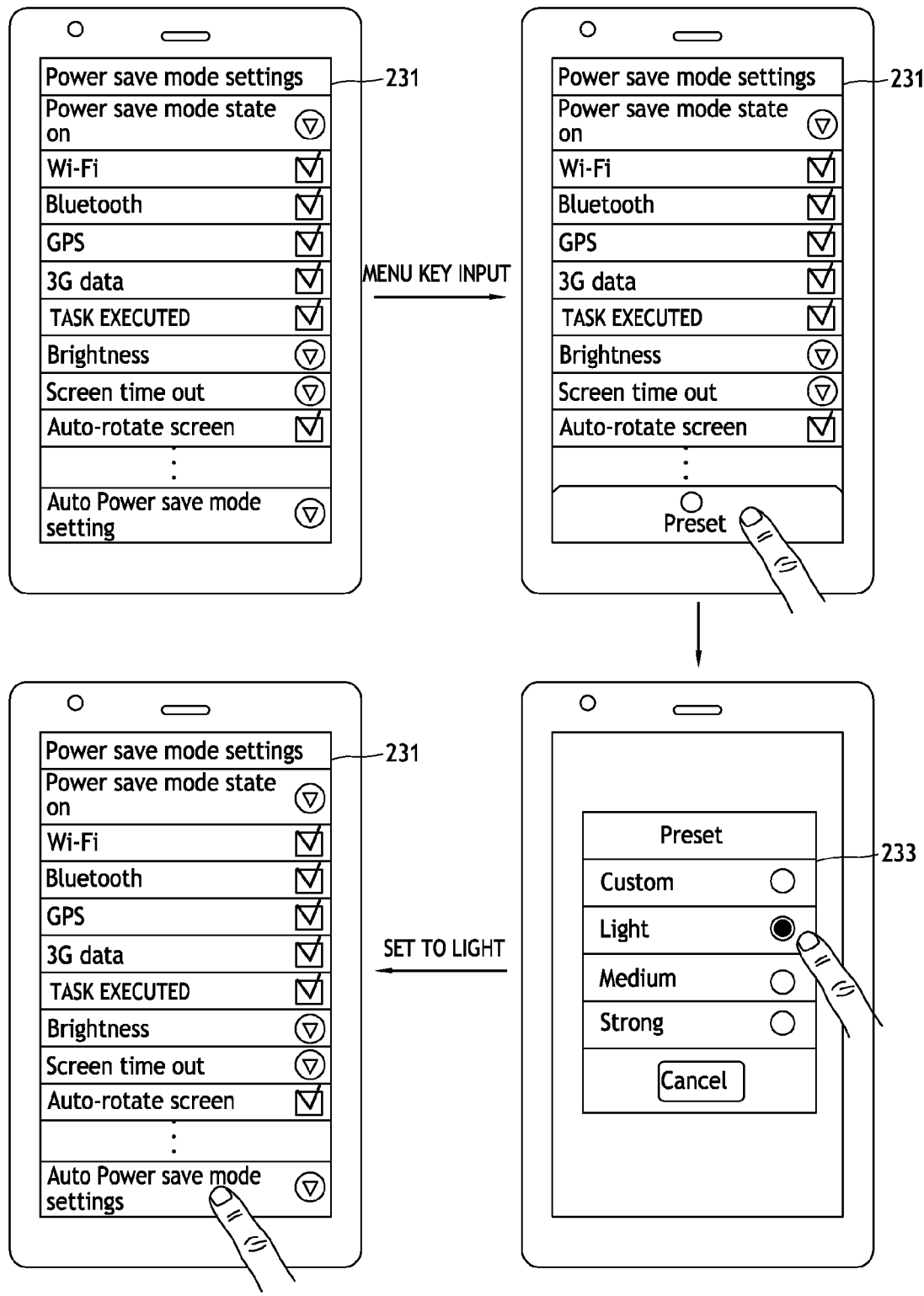

FIGS. 6A and 6B show another exemplary embodiment of setting detailed power saving mode items in the power saving mode.

When a user has set the power saving mode to 'On' 211 or 'Auto 210,' the controller 180 displays a menu 230 for setting a power saving level. The user can set the power saving level to a light, medium, strong or custom level through the corresponding menu. Once the power saving level is set, the user may select an item 'detailed setting' located at a lower portion of the menu so as to perform a detailed setting for the battery items at the set power saving level.

When the item 'detailed setting' is selected, the controller 180 displays a battery power saving mode setting menu 231 containing a plurality of battery related items. A user may set whether or not to use Wi-Fi, Bluetooth, GPS, 3G data, task being executed, and various functions (e.g., brightness, screen time out, auto-rotate screen, animation, gesture, silent, vibrate).

When the detailed setting for the battery related items is carried out, the user may set an auto mode switching condition. The auto mode is a mode of automatically entering the power saving mode when a predetermined percentage of capacity of the battery is left. When the user selects an item 'auto power saving mode settings' from the power saving mode setting menu 231, the controller 180 displays a battery level menu 232 for setting the auto mode. The user may then set one of, for example, 10% to 40% from the battery level menu as a battery level for entry into the auto mode.

FIG. 6B is substantially the same as FIG. 6A except for the order of operations.

As shown in FIG. 6B, when a user sets the power saving mode to 'On' or 'Auto' state, the controller 180 may not display a menu for setting a power saving level but first display 'power saving mode setting menu 231.' When the user enters a menu key from the menu, the controller 180 displays a menu 233 for setting a power saving level. The power saving level menu 233 may be first displayed when the user sets the power saving mode to 'On' or 'Auto.'

The user may set a power saving level (e.g., light, medium, strong and custom) with respect to the battery related items through the power saving level menu 233. When a specific power saving level is set with respect to the battery related item, the controller 180 may automatically set related items appropriate for the specific power saving level. The operations have an advantage in view of reduction of user selection because the controller 180 automatically sets the detailed items when the user merely selects the power saving level without individually setting the power saving items with respect to the battery related items.

FIG. 7 shows an exemplary embodiment of setting a power saving mode using an indicator bar.

As shown in FIG. 7, when a user touches an indicator bar 240 displayed on an idle screen and drags it down by a predetermined distance, then the controller 180 displays 'power saving mode icon' 50 on the indicator bar 241 located below the indicator bar 240. The power saving mode icon 50 may be displayed always or only when the battery level is below a predetermined level.

However, when the remaining capacity of the battery is over a predetermined level even if the power saving mode icon 50 is set to be always displayed every time when the indicator bar 240 is touched and dragged (touch & drag), the power saving mode icon 50 is displayed in an Off state (deactivated state). On the other hand, when the power saving mode icon 50 is set to be displayed only when the battery level is below a predetermined level, when the indicator bar 240 receives the touch & drag, the remaining capacity of the battery may be checked to determine whether or not to display the power saving mode icon 50.

Therefore, the user may select (touch) the displayed power saving mode icon 50 to set detailed power saving items as shown in FIGS. 4A and 4B (or FIGS. 6A and 6B).

Figure 8A:
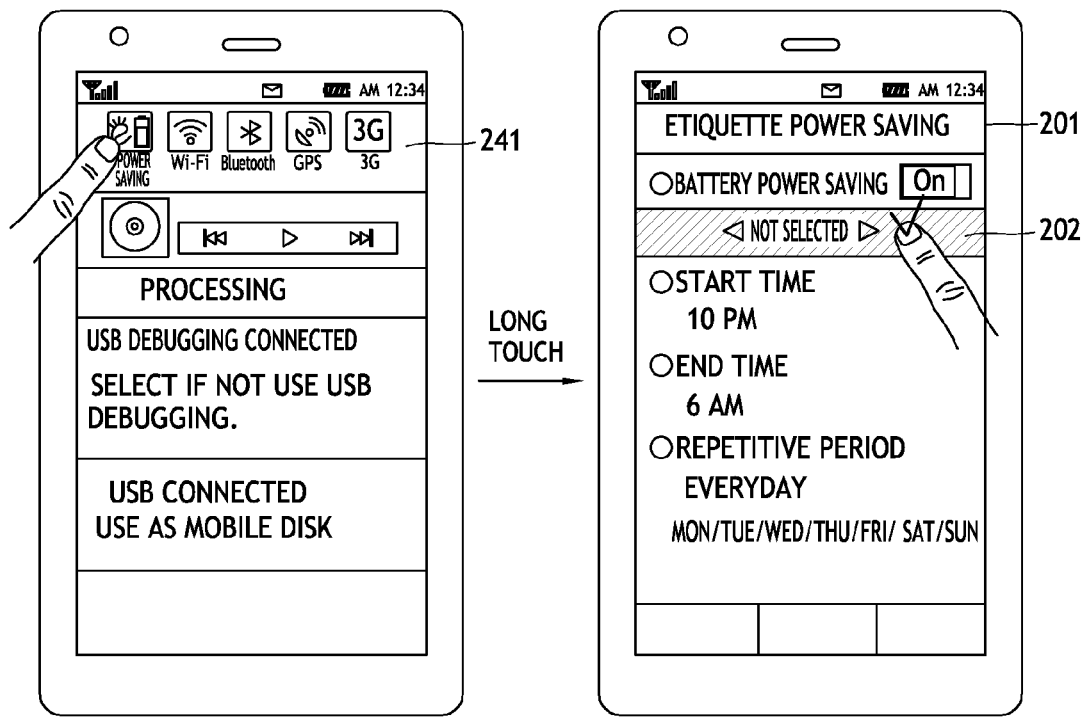
FIGS. 8A and 8B show setting of detailed items of the power saving mode through a power saving mode icon and operation of switching on or off the power saving mode.
Figure 8B:
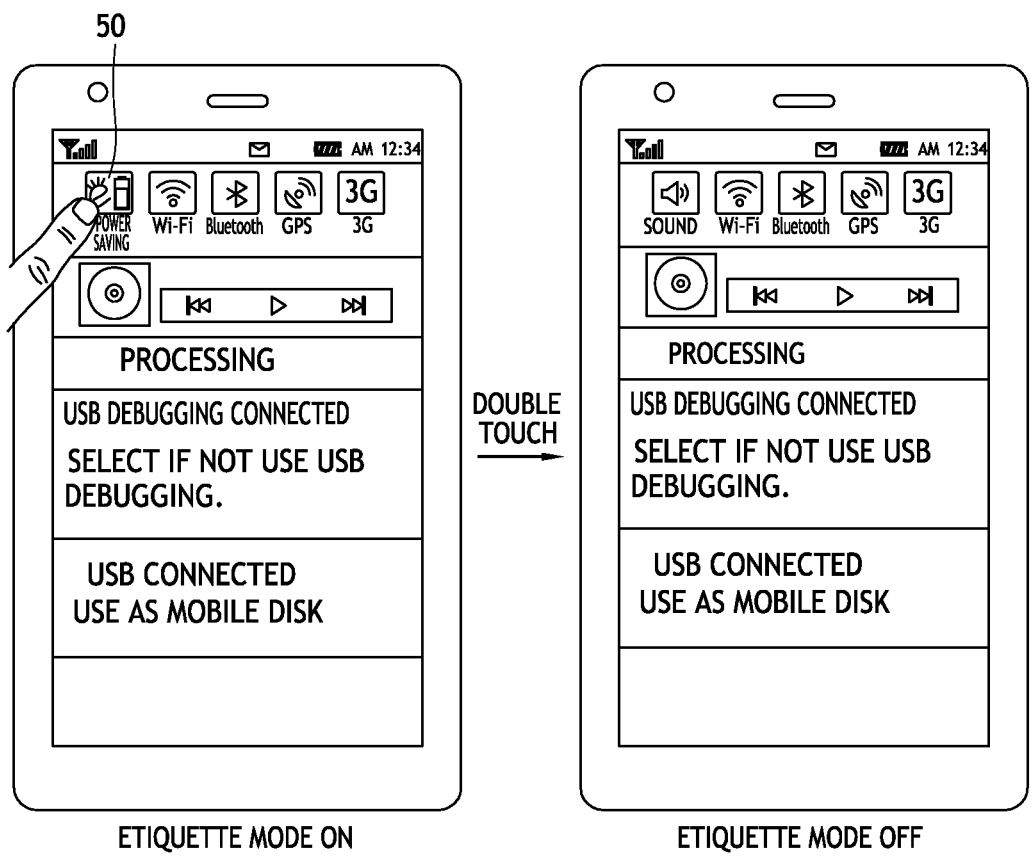

FIGS. 8A and 8B show setting of detailed items of the power saving mode through the displayed power saving mode icon 50 and operation of switching on or off the power saving mode.

When a user selects (by long touch, for example) the power saving mode icon 50 displayed on the indicator bar 240, the controller 180 displays a setting screen of the power saving mode. The user, as shown in FIGS. 4A and 4B, then switches the portion 202 'not selected' to 'selected' on the setting screen 201, thus to set whether or to perform the battery power saving with respect to the detailed setting items, namely, the individual items (FIG. 4A) or the group of items. Also, the user additionally sets the start time, the end time, the repetitive period and the like for the battery power saving with respect to the detailed items for which the battery power saving has been set.

Referring to FIG. 8B, the user may input a touch (short touch) onto the power saving mode icon 50 to switch the power saving mode in the On state (active state) into an Off state (inactive state). That is, the controller 180 displays detailed items for the power saving mode when a long touch is given on the power saving mode icon 50 in the state that the power saving mode icon 50 is displayed (i.e., in the On state), while displaying the power saving mode icon 50 in the inactive state (i.e., Off state) when a short touch is given.

Figure 9A:
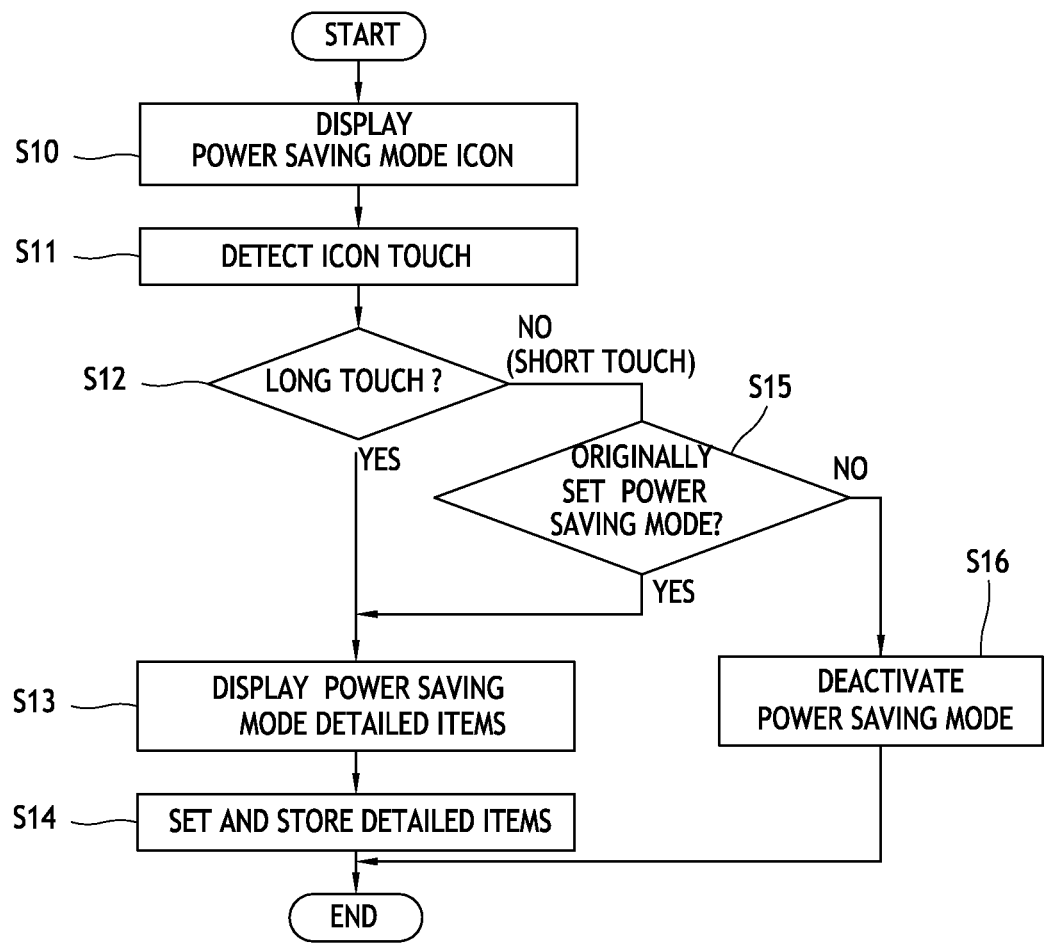

FIG. 9A is a flowchart of selectively displaying detailed items for the power saving mode according to a type of touch with the power saving mode icon displayed, and FIG. 9B exemplarily shows displayed screens according to the flowchart of FIG. 9A.

As shown in FIGS. 9A and 9B, in the state that the power saving mode icon is displayed, the user may touch the corresponding icon 50 to set detailed items for the power saving mode or control the power saving mode to be switched on or off (S10).

When the power saving mode icon 50 is touched, the controller 180 checks whether the corresponding touch is a long touch or not (S11 and S12). If it is checked as the long touch, as aforementioned, the controller 180 displays detailed items for the power saving mode on the screen 201 and stores user settings with respect to the detailed items in the memory 160 (S13 and S14).

On the contrary, if it is checked that the corresponding touch is not the long touch (e.g., a short touch), the controller 180 checks whether the current power saving mode setting is the originally made setting (S15). If it is checked as the initially made setting, the step goes back to the step S13 and the controller 180 displays the detailed items for the power saving mode. If not, namely, if the power saving mode is currently set (i.e., an On (active) state), the currently activated power saving mode icon is deactivated (switched off, released).

The power saving mode may be set in real time according to a user input. The setting of the power saving mode may be reserved or released as well. That is, the power saving mode may be set to be carried out after a predetermined reserved time, and also be set to be automatically released when a specific condition (e.g., setting time, alarm/morning call generation, phone movement and charging) is met.

In the meantime, when a specific event (e.g., schedule) is generated, the power saving mode may be set to be carried out at a time zone (e.g., between two and four in the afternoon) registered in the schedule.

Figure 10:
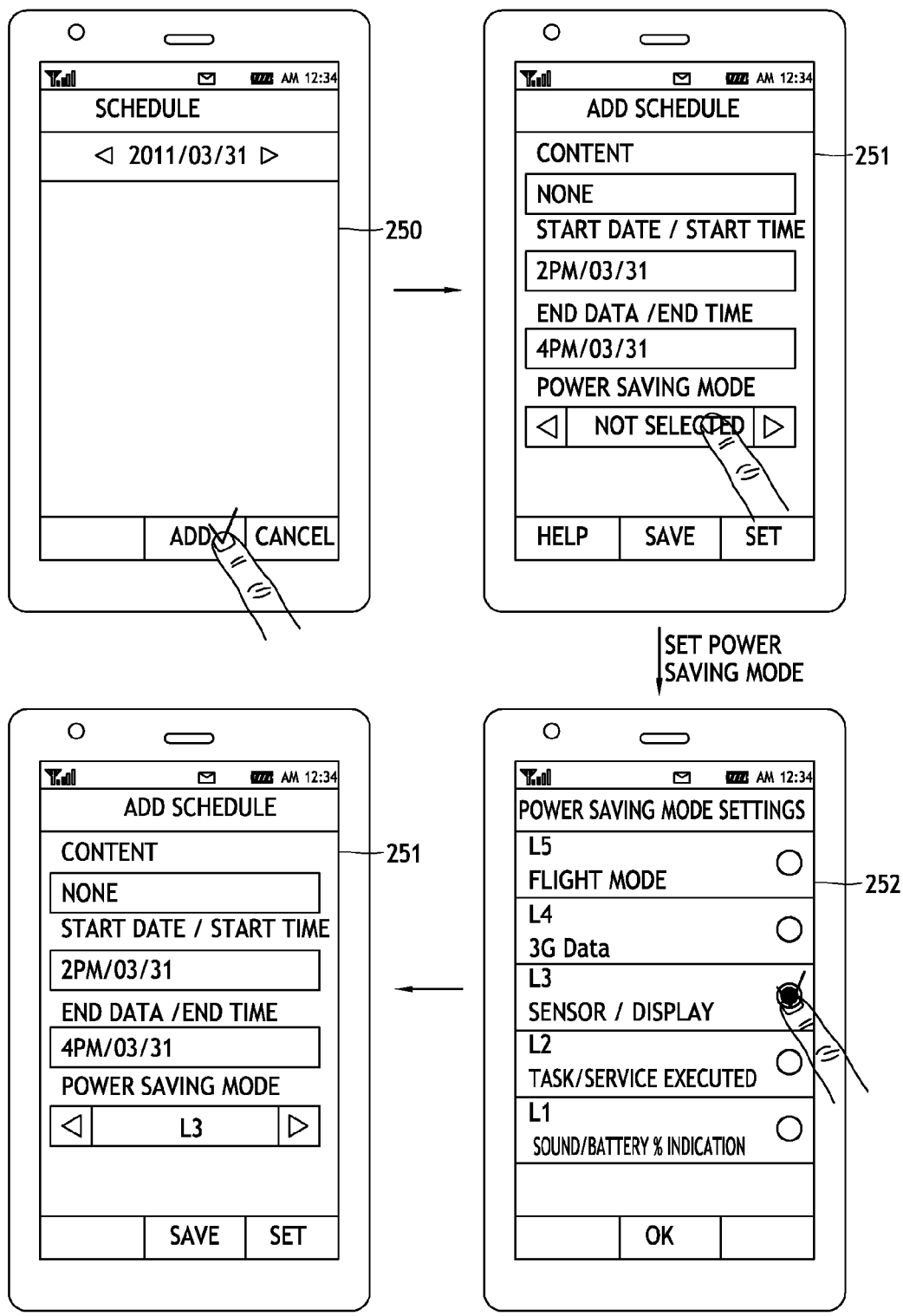
FIG. 10 shows an exemplary embodiment of setting the power saving mode upon generation of a specific event.

FIG. 10 is an exemplary embodiment of setting the power saving mode in response to a specification event generation.

When a specific schedule is generated, a user may select Add item from a schedule menu 250 and select individual items in a schedule menu 251 or a group of items in a power saving mode setting menu 252, thereby setting the power saving mode. The set power saving mode is automatically activated or deactivated at a time registered in the schedule. Especially, when only a start time is set, an end time is automatically set (start time+1 hour) and accordingly the power saving mode is automatically activated or deactivated.

3. Display and Store Power Saving Mode Setting

The set power saving mode icon 50 is displayed on an indicator bar 240 of a screen. Especially, the icon 50 may be activated only when a batter level (the remaining capacity or remainder of the battery) is blow a predetermined level. When the battery level is lowered below the predetermined level, the controller 180 induces an entry into the power saving mode by use of a pop-up or automatically enters the power saving mode.

The displayed power saving mode icon 50 is activated/deactivated by a touch (FIG. 8B) and automatically disappeared when the battery level is risen by charging.

The set power saving mode is stored in the memory 160, so as to be activated (run) according to the battery level related to a user setting, at a predetermined time or when a specific event is generated.

4. Power Saving Mode Entry

The set power saving mode is automatically entered when a predetermined condition, namely, a specific remaining capacity (specific %) of battery, a specific time, a specific place and a specific situation is met. The specific time is a preset time in the power saving mode, and the remaining capacity of the battery includes a power saving level (light, medium, strong and custom) set by a user in the power saving mode, and a level set in automatic mode switching items. The place and situation may indicate a user's location and a user's life pattern (e.g., call/message transmission/reception distribution and sleep mode setting).

The release of the power saving mode may depend on a release condition set by a user, as aforementioned. That is, the power saving mode is automatically deactivated when a battery charging is initiated, a preset time elapses or a specific place or situation goes by. Here, the release conditions set by the user may be as follows setting of start time and end time detection of user's key/touch input detection of phone movement or specific position (e.g., home)

generation of alarm/morning call release of screen lock mode

Figure 11A:
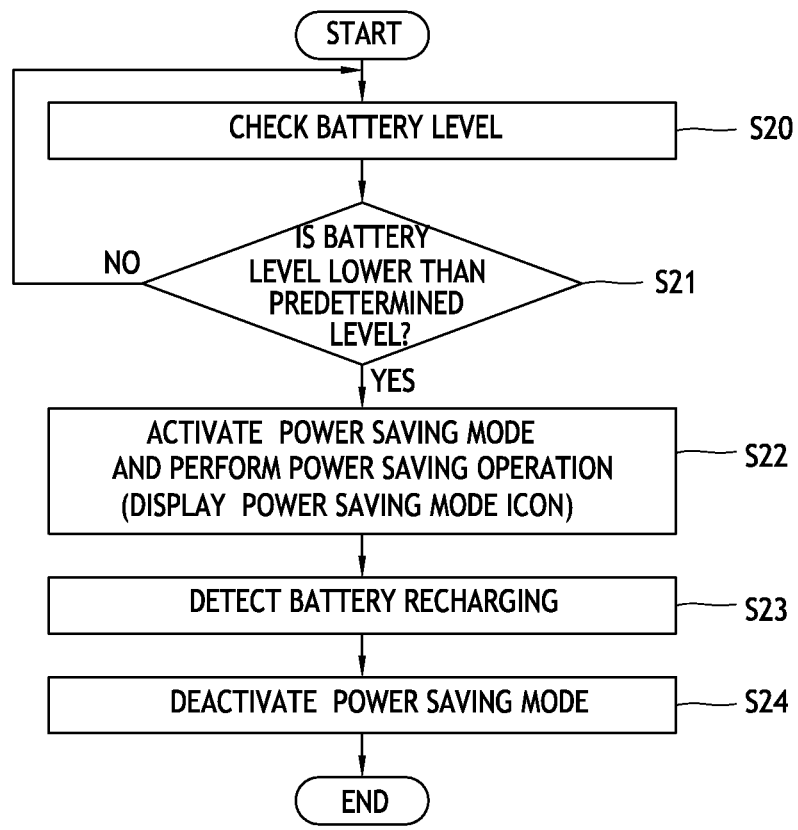
FIGS. 11A and 11B are flowcharts showing an exemplary embodiment of automatically entering a power saving mode according to a usage pattern.
Figure 11B:
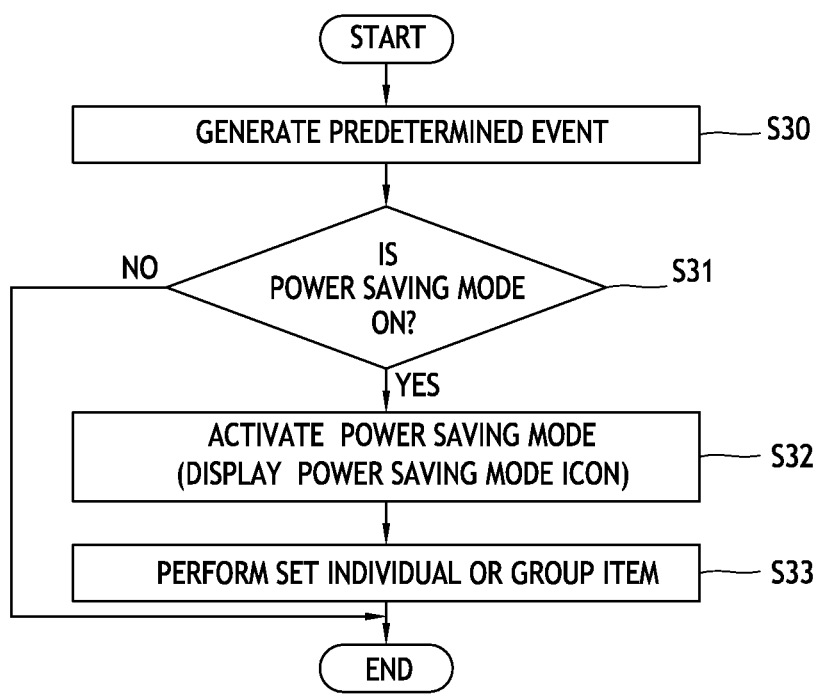

FIGS. 11A and 11B are flowcharts showing exemplary embodiments of automatically entering a power saving mode according to a life pattern (battery usage pattern).

As shown in FIG. 11A, the controller 180 periodically checks the remaining capacity of the battery (i.e., battery level) while the terminal is activated (S20). If the battery level is checked to be below a predetermined level (a predetermined reference value) based on power saving mode settings corresponding to the battery levels, the controller 180 automatically activates the power saving mode and displays an icon indicating the entry into the power saving mode on a screen (S21 and S22). Here, the controller 180 may inform the entry into the power saving mode to the user through a pop-up prior to the entry and then enter into the power saving mode in response to the user input.

The controller 180 deactivates specific battery related items according to power saving items and time settings, which were set by a user based on each battery level. Afterwards, when the user performs charging, then the controller 180 detects the battery charging and automatically activates the power saving mode.

FIG. 11B shows an exemplary embodiment for a case where the power saving mode has been set for a schedule.

When a specific event (e.g., schedule) is generated, the controller 180 checks whether or not the power saving mode has been set for the corresponding schedule (S30 and S31). Afterwards, the controller 1480 activates the power saving mode according to a start time set for the schedule and displays the corresponding icon. The power saving mode is then automatically deactivated at an end time.

5. Screen Displaying in Power Saving Mode

Hereinafter, description will be given of operations of the terminal when the power saving mode is in the On state.

Upon a call or message reception, the controller 180 checks the state of the power saving mode. If it is checked that the power saving mode is in the On state, the controller 180 may perform an automatic answering function in association with a user or a group relating to a preset telephone number (phonebook). If the user does not answer, the controller 180 may automatically process the corresponding call or message. Also, the automatic answering may be processed by a terminal or a server end.

When an alarm or morning call is generated in the On state of the power saving mode, the controller 180 automatically deactivates the power saving mode currently being activated.

Upon reception of an e-mail, the controller 180 checks the state of the power saving mode. In the On state of the power saving mode, the controller 180 may receive both text and attachment, or receive only the text without the attachment and then receive only the attachment after the power saving mode is deactivated, depending on users.

That is, when an e-mail is received in the On state of the power saving mode, both text and attachment file are received when a user who sent the corresponding e-mail is stored in a phonebook or belongs to a specific group, and otherwise, the text is first received and the attachment is received after the power saving mode is deactivated.

When a specific content (e.g., photo, video, MP3, TV, etc.) is played in the On state of the power saving mode, the controller 180 adjusts screen brightness (luminance) to a readable level and then selectively controls a displayed screen according to a type of each content.

As one example, in regard of a photo, only title information is first displayed on a screen and then an image is displayed on the screen upon reception of a user input (capable of displaying part or all of detailed information).

When a video is played, the controller 180 outputs only sound with a display screen off, or scans I-frame information and displays them like a photo slide show.

When an MP3 is played, the controller 180 automatically releases an equalizer and outputs only sound with a display screen off.

When a user watches TV in the On state of the power saving mode, the controller 180 may display a specific portion of a screen with the other off, or output only sound with the display screen off.

When a 3D image is displayed in the On state of the power saving mode, the controller 180 converts the corresponding 3D image into 2D image and displays the 2D image.

Especially, when the power saving mode is in the On state, the controller 180 may display not an original screen (first UI) (on which photo, browser screen and still image are displayed together with text information) but a screen (second UI), which is made by reconstructing a part of the screen (first UI) into a simplified form. When the power saving mode is in the Off state, the controller 180 may display the original screen (first UI). As one example, when the user selects an address book view in the On state of the power saving mode, the controller 180 displays the second UI reconstructed into the simplified form containing only text information without an image of the address book. When the power saving mode is deactivated, the controller 180 displays the original screen (first UI) containing the image of the address book.

As described above, a battery power saving function may be set with respect to individual items or a group of items of the battery by a power saving mode, the power saving mode may be switched on or off based upon a user's life pattern, and a simplified screen displaying may be provided in the battery power saving mode, thereby reducing consumption of the battery power.

The power saving mode is a term indicating a mode activated (run) by low power consumption, and if having the same meaning, other terms, for example 'battery power saving mode' or 'green power saving mode,' will replace the power saving mode.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The configurations and methods of the mobile terminal in the aforesaid embodiments may not be limitedly applied, but such embodiments may be configured by a selective combination of all or part of the embodiments so as to implement many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling a power saving mode in a mobile terminal, the method comprising:
    analyzing at least a battery level or a usage pattern of the mobile terminal;
    activating the power saving mode according to the analyzed at least battery level or usage pattern;
    displaying a menu, on a display, for deactivating at least one component of the mobile terminal when the power saving mode is activated;
    downloading only text of a received e-mail that includes the text and an attachment when the power saving mode is activated and downloading the text and the attachment when the power saving mode is deactivated; and
    deactivating the power saving mode in response to lapse of a specific period of time, releasing a screen lock, or generating an alarm;
    wherein:
    the power saving mode is activated based on the usage pattern when the battery level reaches a first level;
    the power saving mode is activated automatically when the battery level is dropped to a second level that is lower than the first level; and
    the usage pattern includes at least a battery usage pattern, a call pattern, a messaging pattern, a location of the mobile terminal, a set time of a specific mode, or a schedule.

2. The method of claim 1, further comprising:
    automatically deactivating at least one component of the mobile terminal when the battery level is below a threshold value.

3. The method of claim 1, further comprising:
    displaying an icon indicating that the power saving mode is activated.

4. The method of claim 3, further comprising:
    displaying the menu for deactivating the at least one component when the displayed icon is selected.

5. The method of claim 4, wherein:
    the at least one component comprises individual components or groups of components
    each of the individual components comprises at least base station wireless data, mobile terminal sensors, or display settings; and
    each of the groups of components comprises at least two of the individual components.

6. The method of claim 1, further comprising:
    activating an automatic answering function in response to receiving a call at the mobile terminal when the power saving mode is activated.

7. The method of claim 1, further comprising:
    modifying content according to a type of the content when the power saving mode is activated.

8. The method of claim 7, wherein modifying the output mode of the content comprises outputting only sound associated with a video when the content includes the video and the sound.

9. The method of claim 7, wherein modifying the output mode of the content comprises displaying only text of the content when the content includes the text and an image.

10. The method of claim 1, further comprising activating the power saving mode in response to a touch and drag input on a displayed indicator bar.

11. The method of claim 1, further comprising:
    displaying an icon indicating that the power saving mode is activated; and
    deactivating the power saving mode in response to an input received at the displayed icon for a period of time that is less than a threshold time period.

12. The method of claim 1, further comprising displaying a plurality of option icons in response to a touch and drag input to an indicator bar;
    wherein the plurality of option icons comprises an option icon for activating the power saving mode only when the battery level is below a threshold battery level value.

13. A mobile terminal comprising:
    a display configured to display information associated with a power saving mode of the mobile terminal;
    a storage configured to store settings associated with the power saving mode; and
    a controller configured to:
        analyze at least a battery level or a usage pattern of the mobile terminal;
        activate the power saving mode according to the analyzed at least battery level or usage pattern;
        cause the display to display a menu for deactivating at least one component of the mobile terminal when the power saving mode is activated;
        download only text of a received e-mail that includes the text and an attachment when the power saving mode is activated and download the text and the attachment when the power saving mode is deactivated; and
        deactivating the power saving mode in response to lapse of a specific period of time, releasing a screen lock, or generating an alarm;
    wherein:
    the power saving mode is activated based on the usage pattern when the battery level reaches a first level;
    the power saving mode is activated automatically when the battery level is dropped to a second level that is lower than the first level; and
    the usage pattern includes at least a battery usage pattern, a call pattern, a messaging pattern, a location of the mobile terminal, a set time of a specific mode, or a schedule.

14. The terminal of claim 13, wherein the controller is further configured to cause the display to display an icon when a touch and drag input is received on an indicator bar displayed on the display.

15. The terminal of claim 13, wherein:
the at least one component comprises individual components or groups of components;
each of the individual components comprises at least base station wireless data, mobile terminal sensors, or display settings; and
each of the groups of components comprises at least two of the individual components.

16. The terminal of claim 14, wherein the controller is further configured to:
cause the display to display the menu for deactivating the at least one component when an input is received at the displayed icon for a period of time that is greater than a threshold time period; and
deactivate the power saving mode when the input is received at the icon for a period of time that is less than the threshold time period.

17. The terminal of claim 13, wherein the controller is further configured to
activate an automatic answering function in response to receiving a call at the mobile terminal when the power saving mode is activated.

18. The terminal of claim 13, wherein the controller is further configured to modify an output mode of content according to a type of the content when the power saving mode is activated.

19. The terminal of claim 18, wherein the controller is further configured to cause output of only sound associated with a video via an audio output unit when the content is the video.

20. The terminal of claim 18, wherein the controller is further configured to cause the display to display only text of the content when the content includes the text and an image.

21. The terminal of claim 13, wherein the controller is further configured to cause the display to:
display an icon indicating that the power saving mode is activated in response to a user input for activating the power saving mode; and
display the menu for deactivating the at least one component of the mobile terminal in response to an input received at the displayed icon.

22. The terminal of claim 13, wherein the controller is further configured to cause the display to display a plurality of option icons in response to a touch and drag input to an indicator bar;
wherein the plurality of option icons comprises an option icon for activating the power saving mode only when the battery level is below a threshold battery level value.

* * * * *